United States Patent [19]
Eckman

[11] 4,058,238
[45] Nov. 15, 1977

[54] DISPENSER

[76] Inventor: Ronald E. Eckman, 1797 Bolling Ave., Louisville, Ky. 40210

[21] Appl. No.: 632,265

[22] Filed: Nov. 17, 1975

[51] Int. Cl.² ............................................. G01F 11/26
[52] U.S. Cl. .................................................. 222/305
[58] Field of Search ................ 222/305, 362, 363, 364

[56] References Cited

U.S. PATENT DOCUMENTS

| 1,411,000 | 3/1922 | Condon | 222/305 |
|---|---|---|---|
| 1,752,527 | 4/1930 | Howard | 222/364 |

FOREIGN PATENT DOCUMENTS

| 1,052,698 | 12/1966 | United Kingdom | 222/363 |

*Primary Examiner*—Stanley H. Tollberg
*Assistant Examiner*—Hadd Lane

[57] ABSTRACT

The present invention provides an arrangement for successively delivering measured quantities of selected fluid material from a container where the fluid material can include liquids or free flowing granular materials and the device includes a cap member adapted for connection to the container for the fluid where the cap member has at least one cooperative opening means therein: first chamber means carried by the cap means to be disposed within the container defined by spaced sidewalls extending laterally from the bottom of the cap means in generally parallel relation and endwall means extending between the sidewalls and around a portion of the periphery of the sidewalls where the endwall and sidewall means are adapted to provide a first opening from the chamber communicating with the container and a second opening communicating with the opening of the cap means to provide for admission of fluid to the chamber and emission of fluid from the chamber, first moveable closure means to selectively cover the first opening and second moveable cover means to cover the second opening where the first and second closure means are interconnected for common movement from the first position to cover the first opening and to open the second opening to a second position to cover the second opening and open the first opening; and adjustable wall means located within the chamber means to selectively adjust the amount of fluid which can be admitted to the chamber from the container when the first opening is uncovered.

2 Claims, 3 Drawing Figures

DISPENSER

BACKGROUND OF THE INVENTION

The present invention provides a device for dispensing measured quantities of selected fluid materials and is particularly useful in dispensing measured quantities of granular free flowing fluids.

Prior means of dispensing granular materials have generally included simple pour spouts pivotably cooperatively disposed in the cap of selected containers of such granular material, for example, salt, sugar, coffee, etc. Such devices have not provided means for successively and uniformly measuring the amount of material dispensed, but rather have been provided for pouring such materials into external measuring devices such as spoons, cups etc.

While various types of industrial equipment have been provided for metering or measuring and delivering selected quantities of granular free flowing material, such equipment is extremely expensive and used generally only in commercial or industrial applications where costs of such equipment can be justified.

At present, no useful inexpensive, measuring device is known which is useful in dispensing measured quantities of granular material for use by consumers. More particularly, no present apparatus is known to be available which is so inexpensive that it is economical to dispose of the measuring apparatus upon emptying the container to which the apparatus is attached.

Various other devices have been made available for dispensing measured quantities of liquids which are inexpensive enough for use by consumers, but such devices are generally adapted only to deliver a preselected quantity of liquids determined at the time the apparatus is manufactured and no device is presently known for delivering measured quantities of a liquid where the quantity to be delivered can be easily modified by the user of the device.

SUMMARY OF THE INVENTION

The present invention provides a straightforward, very inexpensive, device for delivering selected and variable quantities of a fluid material.

Devices in accordance with the present invention can be adapted to be included in caps of various containers, for example, containers for granular free flowing material such as coffee or salt, at the time the containers are closed at the manufacturing location.

The present invention further provides a straightforward, extremely inexpensive, dispensing device for dispensing fluid materials in preselected volumes where the volume of material to be dispensed can be selectively determined by the user of the device.

Devices in accordance with the present invention can be adapted to be carried in the cap of various containers, for example, containers for granular free flowing materials.

The present invention provides an arrangement for successively delivering measured quantities of selected fluid material from a container where the fluid material can include liquids or free flowing granular materials and the device includes a cap member adapted for connection to the container for the fluid where the cap member has at least one cooperative opening means therein: first chamber means defined beneath said cap means to be disposed within the container, defined by spaced sidewalls extending laterally from the bottom of the cap means in generally parallel relation and endwall means extending between the sidewalls and around a portion of the periphery of the sidewalls where the endwall and sidewall means are adapted to provide a first opening from the chamber communicating with the container and a second opening communicating with the opening of the cap means to provide for admission of fluid to the chamber and emission of fluid from chamber, first moveable closure means to selectively cover the first opening and second moveable cover means to cover the second opening where the first and second closure means are interconnected for common movement from the first position to cover the first opening and to open the second opening to a second position to cover the second opening and open the first opening; and adjustable wall means located within the chamber means to selectively adjust the amount of fluid which can be admitted to the chamber from the container when the first opening is uncovered.

Various other features of the present invention will become obvious to those skilled in the art upon reading the disclosure set for the hereinafter.

BRIEF DESCRIPTION OF THE DRAWINGS

One example of an arrangement in accordance with the present invention is shown in the accompanying drawings where:

Referring now to FIG. 1, the dispensing device is provided in a lid or cap 1 which can be adapted to be received in a selected container. The device provides a first chamber 2 defined by generally semicircular sidewalls 3-3A located in spaced mutually parallel relation from the underside of cap 1 to define the sides of chamber 2. An endwall 4 of generally semicircular cross section (FIG. 2) is provided to extend between the edges of sidewalls 3 and 3A from an edge C abutting the underside of cap 1 around a portion of the edges of sidewalls 3-3A to terminate at an edge 3D so an opening 6 is defined to chamber 2.

Figure 1:
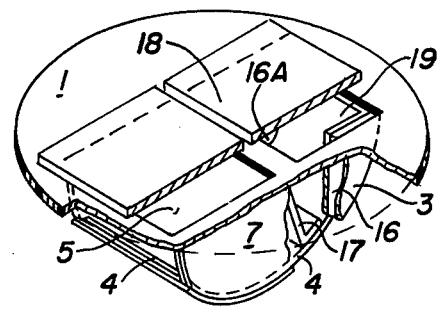
FIG. 1 is a partially cutaway perspective view of a dispensing device in accordance with the present invention.
Figure 2:
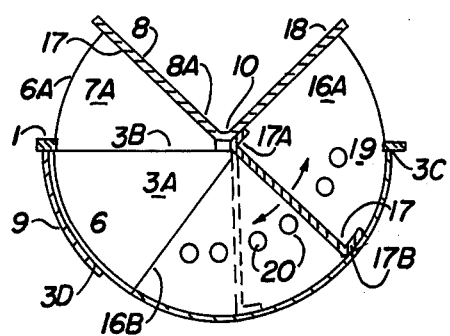
FIG. 2 is a view taken along a plane passing through line 2—2 of FIG. 1 showing flap members in open position.

A closure valve assembly is provided to selectively close opening 6 including spaced sidewalls 7-7A of arcuate shape having generally the same diameter as the diameter of semicircular side-walls 3-3A where sidewalls 7-7 A are adapted to be received on the outside surfaces of sidewalls 3-3A and slide over a portion of the outer surfaces of sidewalls 3-3A as hereinafter described. The closure assembly is advantageously received in an opening 5 provided in cap 1. Sidewalls 7-7A are connected along edges 7C to a flap 8 which is pivotably connected to cap 1 along an edge 8A of flap 8 as shown where flap 8 can be moved from first position, as shown in FIG. 1, covering opening 5 to a second position as shown in FIG. 2 with flaps 8 and 18 in open position. The valve closure moves with movement of flap 8 as hereinafter described. An endwall 9 of generally semicircular cross section is provided to extend between sidewalls 7-7A along a portion of the perimeter of sidewalls 7-7A to provide a closure for opening 6 from chamber 2 as shown in FIG. 2. Endwall 9 advantageously terminates a selected distance from flap 8 to provide an opening 6A as shown in FIG. 2 for emission of material from chamber 2 when flap 8 is lifted away from cap 1 so endwall 9 covers opening 6.

Within the scope of the present invention, means can be provided to selectively vary the volume of material admitted to chamber 2. Referring to FIGS. 1 and 2, moveable, spaced, generally parallel semicircular sidewalls 16-16A are disposed in chamber 2 inside walls 3-3A for and connected to a closure 18 adapted for pivotal movement about lid 1. The lower edges of walls 16-16A can be semicircular of approximately the same diameter as walls 3-3A and can be disposed to abutt walls 3-3A. A cooperative opening 19 can be provided, as shown, in cap 1 so that walls 16-16A can be moved into and out of chamber 2 as hereinafter described. The top edges of walls 16-16A can be connected to cooperative flap 18 pivotably connected to cap 1 so that sidewalls 16, 16A move into and out of chamber 2 wih movement of cap 18.

Within the scope of the present invention, the volume of material received in and dispensed from chamber 2 can be selectively varied. In the example shown, a flap 17 is pivotably connected to flap 18 by means of a turned down leg 17A and is disposed to extend into chamber 2. Advantageously, flap 17 extends through the depth of chamber 2 from adjacent cap 1 to endwall 4 and carries a laterally extending leg 17B to engage endwall 4 so that a chamber 2A (FIG. 2) is defined with flap 17 as an endwall. Flap 17 can be selectively positioned in chamber 2 to selectively vary the volume of chamber 2A as desired. Advantageously, protrusions 20 can be provided on wall 3A or 3 or both to extend into chamber 2 to retain flap 17 at selected locations in chamber 2 when the edge of flap 17 comes to rest between adjacent protrusions 20.

Figure 3:
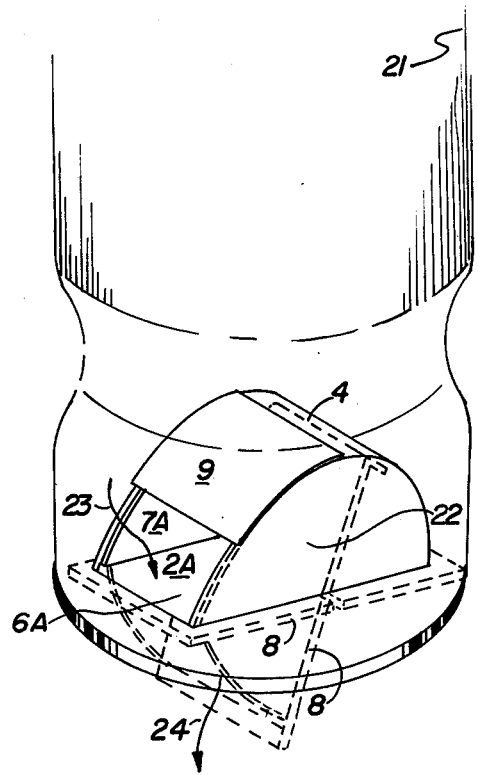
FIG. 3 is a view of the example of the device in accordance with the present invention as shown in FIG. 1 incorporated in a container.

FIG. 3 shows operation of an arrangement 22 as shown in FIGS. 1 and 2 in place in an inverted container 21 which can include granular free flowing material (not shown).

The arrangement shown illustrates the cap in full line in firs position to receive material as indicated by arrow 23 through opening 6A into chamber 2A, that is, flap 8 is closed against cap 1 so that, when container 21 is inverted, the fluid material in container 21 fills chamber 2A.

Flap 8 is then opened to the position shown in dotted lines and as also shown in FIG. 2, so that material indicated by arrow 24 flows out of chamber 2A.

As shown in FIGS. 1 and 2 and previously described, flap 18 is provided to cover opening 19 in cap 1 where opening 19 is advantageously provided to permit access to chamber 2 for positioning flap 17.

Specifically, in the example shown, flap 17 can be positioned in chamber 2 by opening flaps 8 and 18 and moving flap 17 to the desired position where the position is secured by means of protrusions 20 as previously described.

It is to be understood that the foregoing is but one example of an arrangement within the scope of the present invention and that various other arrangements within the scope of the present invention as claimed hereinafter will occur to those skilled in the art upon reading the disclosures set forth hereinbefore.

The invention claimed is:
1. An arrangement for delivering measured quantities of fluid material from a container having a cooperative opening including:
  a. a cap member adapted to be secured over said opening of said container, having an inner surface exposed to said container and an outer surface said cap member having first and second cooperative cap means openings therein;
  b. first chamber means rotatably carried in the inner surface of said cap means to be disposed in said container in communicative relation with said first and second cap openings to receive fluid from said container, said chamber means being defined by at least two spaced, generally parallel, first sidewall means adapted to extend laterally from said cap means where a portion of said first sidewall means are received through said first cap opening, first endwall means extending between said sidewall means along a portion of the perimeter of each, and terminating in a first edge to define a first fluid opening to said first chamber for admission of fluid material from said container to said first chamber and second endwall means pivotably secured to the outer surface of said cap means extending between the portions of said sidewall means extending through said first cap opening where said second endwall means define one side of said first fluid opening and where said second endwall means is moveable from first position covering a portion of said first cap opening to a second position to move a portion of said sidewall means through said first cap opening and wherein said first fluid opening is moved from first position within said container to second position to expose said first fluid opening to the outer surface of said cap means;
  c. moveable wall means located within said first chamber extending generally between said sidewall means and having a first edge pivotably secured adjacent the inner surface of said cap means between said first and second cap opening means and extending outwardly therefrom to a sliding edge contacting said first endwall means so that said moveable wall means can be selectively positioned within said first chamber to define a first compartment of selected volume communicating with said first cap opening means and said first fluid opening and a second compartment communicating with said second cap opening means.

2. The invention of claim 1 wherein at least one surface of said sidewall means within said chamber means is provided with adjustment indexing means to contact said movable wall means to facilitate the determination of the volume of fluid to be dispensed from said first compartment.

* * * * *